United States Patent [19]
Klinedinst et al.

[11] Patent Number: 5,994,838
[45] Date of Patent: Nov. 30, 1999

[54] MERCURY VAPOR DISCHARGE LAMP HAVING MEANS FOR REDUCING MERCURY LEACHING

[75] Inventors: Keith A. Klinedinst, Hudson; Dennis B. Shinn, Topsfield; Richard A. Fowler, Ipswich, all of Mass.

[73] Assignee: Osram Sylvania Inc., Danvers, Mass.

[21] Appl. No.: 09/035,958

[22] Filed: Mar. 6, 1998

[51] Int. Cl.$^6$ .................................................. H01J 17/26
[52] U.S. Cl. ........................... 313/565; 313/638; 313/639
[58] Field of Search ..................... 313/565, 638, 313/639, 485, 490; 445/2, 26, 61, 73

[56] References Cited

U.S. PATENT DOCUMENTS

| | | | |
|---|---|---|---|
| 4,268,306 | 5/1981 | Bjorkman | 75/81 |
| 4,435,284 | 3/1984 | Heytmeijer | 209/3 |
| 4,715,838 | 12/1987 | Kulander | 445/61 |
| 5,229,686 | 7/1993 | Fowler et al. | 313/565 |
| 5,229,687 | 7/1993 | Fowler et al. | 313/565 |
| 5,777,434 | 7/1998 | Dietrich et al. | 313/565 |

OTHER PUBLICATIONS

Federal Register, pp. 26987–26998, vol. 55, No. 126, Jun. 29, 1990.
Advances in Catalysis, J.H. Baxendale, pp. 31–85, vol. IV, 1952.

*Primary Examiner*—Nimeshkumar D. Patel
*Assistant Examiner*—Michael J. Smith
*Attorney, Agent, or Firm*—Carlo S. Bessone

[57] ABSTRACT

In a mercury vapor discharge lamp having an envelope of light-transmitting vitreous material and containing an inert gas and a quantity of elemental mercury at least partially convertible to soluble mercury, and first and second electrodes disposed within the envelope for establishing an arc discharge therebetween, an improvement comprising an effective amount of a nonmetallic copper-containing compound disposed in the lamp which, when the lamp is pulverized to granules and subjected to a suitable aqueous acid solution, dissolves in the aqueous acid solution, resulting in a concentration of extracted mercury less than 0.2 mg per liter of solution; and a method for reducing the amount of mercury extracted from a mercury vapor discharge lamp when the lamp is pulverized to granules and subjected to a suitable aqueous acid solution, such that the resulting concentration of extracted mercury is less than 0.2 mg per liter of solution, the method comprising the step of placing in the lamp in manufacture thereof an effective amount of a nonmetallic copper-containing compound soluble in the aqueous acid solution.

9 Claims, 6 Drawing Sheets

MERCURY VAPOR DISCHARGE LAMP HAVING MEANS FOR REDUCING MERCURY LEACHING

BACKGROUND OF THE INVENTION

1. Field of the Invention

This invention relates in general to mercury vapor discharge lamps and pertains, more particularly, to a fluorescent lamp which contains an agent for substantially reducing the amount of mercury which is extractable after pulverization of the lamp.

2. Description of the Prior Art

Fluorescent lamps are well known in the art and are characterized as mercury vapor discharge lamps which include a pair of electrodes sealed in an elongated envelope whose interior surface is coated with phosphor. The envelope contains a quantity of mercury and a rare gas at a reduced pressure, for example, in the order of 1–5 torr.

During lamp manufacture, about 5–40 milligrams of elemental mercury is sealed in each fluorescent lamp. It is known that most of the mercury adheres to the phosphor coating with only a very small portion of the mercury being in the form of mercury vapor. After alkaline earth metal oxides coating the lamp electrodes are volatized, the oxides decompose in the discharge space and freed oxygen converts some of the elemental mercury to a salt or compound, such as mercuric oxide (HgO) which is highly soluble.

There is concern that a waste stream resulting from the disposal of fluorescent lamps may leach excessive amounts of the soluble form of mercury. One method of measuring the amount of soluble mercury which may leach from the waste stream resulting from the disposal of fluorescent lamps is described in the Toxicity Characteristic Leaching Procedure (TCLP) prescribed on pages 26987–26998 of volume 55, number 126 of the Jun. 29, 1990 issue of the Federal Register. According to the procedure, the lamp being tested is pulverized into granules having a surface area per gram of material equal to or greater than 3.1 cm$^2$ or having a particle size smaller than 1 cm in its narrowest dimension. Following pulverization, the granules are subjected to an extraction fluid comprising a sodium acetate buffer solution having a pH of approximately 4.93 and having a weight twenty times the weight of the granules.

The Environmental Protection Agency (EPA) defines a maximum concentration level for mercury at 0.2 milligram extractable mercury per liter of extract fluid when the TCLP is applied. Accordingly, it is desirable that the concentration of mercury dissolved in the extraction fluid be as low as possible, and particularly less than 0.2 mg per liter of extraction fluid.

Various methods have been proposed which attempt to treat or process burned-out discharge lamps, or scrap lamp exhaust tubing containing mercury, in order to reclaim the mercury and thereby reduce the amount of mercury-contaminated scrap glass. For example, U.S. Pat. No. 4,268,306 (Bjorkman) discloses a treatment whereby the expended or scrapped lamps are crushed into fragments which are then placed in a treatment vessel in which the mercury is recovered by distillation processes. This treatment is carried out batchwise in a sealed container into which nitrogen is introduced. The container is heated and placed under vacuum to vaporize the mercury. The vaporized mercury is then removed from the container and condensed in a cooling trap. Following the process, the treated lamp fragments, i.e., glass and phosphor, may be dumped without concern about mercury leaching.

U.S. Pat. No. 4,715,838 (Kulander) teaches a method and apparatus for recovering the luminescent material from mercury vapor electric discharge lamps, whereby the amount of lamp waste requiring treatment in a distillation chamber can be reduced, thereby increasing the capacity of the chamber with respect to the number of lamps. After the ends of the lamp bulb, or tube, are separated from the intermediate bulb part, the luminescent material is loosened from the inner wall surface of the bulb part with the aid of a stripping device which is arranged to be inserted into the bulb part from one end thereof. The loosened material is collected with the aid of a suction device connected to the other end of the bulb part and, thereafter, may be introduced into the distillation chamber, thereby obviating the need to fill the chamber with the residual "clean" glass bulb.

Japanese Patent Application No. 58-184558 (Kitsugi et. al.) teaches a method for solidifying discarded fluorescent lamps and insolubilizing the mercury contained therein. The method involves adding sulfur to crushed fluorescent lamp waste. The result is pulverized an amount of time sufficient to produce granules with sizes 5 millimeters or less. Cement and water are added and the result is kneaded. The kneaded material prepared in this way is put into molds to form a stabilized solidified material having a mercury concentration of less than 0.005 milligram per liter water.

U.S. Pat. No. 4,435,284 (Heytmeijer) teaches a process for removing residual mercury from scrap fluorescent lamp exhaust tubulation, or similar scrap glass. A very small predetermined amount of finely divided silica or alumina powder is added to the mercury contaminated scrap glass and the mixture is agitated for a short predetermined time during which the mercury is stripped from the tubulation. The separated mercury, powder and glass mixture is then decanted through a screen of suitable mesh to remove the separated mercury and powder from the glass. The mercury is then rinsed with a suitable solvent to remove the oxide powder from the mercury.

U.S. Pat. Nos. 5,229,686 (Fowler et. al.) and 5,229,687 (Fowler et. al.) relate to a mercury discharge lamp which can be disposed of without prior expensive treatment to reclaim mercury. Such is accomplished by the provision of a mercury vapor discharge lamp having an envelope of light-transmitting vitreous material containing an inert starting gas and a quantity of elemental mercury at least partially convertible to soluble mercury. In the '686 patent, an effective amount of a chemical agent suitable for chemically converting a substantial portion of the mercury to a sparingly soluble salt when the lamp is pulverized to granules and subjected to a suitable aqueous acid solution is located within the lamp. Preferably, the sparingly soluble salt is soluble to less than 0.2 milligram per liter mercury. In a preferred embodiment, the chemical agent comprises approximately 3.45 grams of potassium periodate. The lamp further includes a sealed enclosure (e.g., glass) for containing the chemical agent. The sealed enclosure is disposed within the lamp envelope or external to the envelope, such as within a cavity defined by a lamp base member. The sealed enclosure is rupturable upon pulverization of the lamp. In an alternative embodiment, the chemical agent is mixed with the basing cement used to secure one or more of the lamp bases to the lamp envelope. Unfortunately, the quantity of chemical agent required to chemically combine nearly all of the mercury within a fluorescent lamp may be so large as to be inconvenient or impossible to contain within a standard lamp envelope.

In the '687 patent, first and second electrodes are located within the lamp envelope for establishing an arc discharge therebetween. An effective amount of a chemical agent suitable for electrochemically reducing a substantial portion of the soluble mercury to elemental mercury when the lamp is pulverized to granules and subjected to a suitable aqueous acid solution is located within the lamp and effectively remote from the arc discharge. The chemical agent is an element having an electrode potential for oxidation reactions higher than mercury but not sufficiently active to displace hydrogen from the aqueous acid solution. In one embodiment, the chemical agent comprises approximately 0.5 to 5 grams of copper powder or copper dust. In another embodiment, the chemical agent comprises approximately 0.25 gram to 5 grams of iron powder. The lamp further includes a sealed enclosure (e.g., glass) for containing the chemical agent. The sealed enclosure is disposed within the lamp envelope or external to the envelope, such as within a cavity defined by a lamp base member. The sealed enclosure is rupturable upon pulverization of the lamp. In an alternative embodiment, the chemical agent is mixed with the basing cement used to secure one or more of the lamp bases to the lamp envelope. Again, however, it may be difficult or impossible to incorporate a sufficiently large quantity of a finely divided metal within a fluorescent lamp, particularly in smaller and more compact lamps. Further, if not completely encapsulated, the metallic substance may interfere with or even prevent the normal operation of the electric lamp.

Accordingly, there is a need for a fluorescent lamp having disposed in the envelope thereof an agent which in small quantities is effective to reduce the amount of extractable mercury within the lamp to less than 0.2 milligram per liter of an aqueous acid solution, as prescribed in the TCLP.

There is further a need for a method for reducing mercury that is extracted from a fluorescent lamp to less than 0.2 milligrams per liter of an aqueous acid solution, as prescribed in the TCLP.

SUMMARY OF THE INVENTION

An object of the invention is, therefore, to provide a fluorescent lamp having disposed therein an agent which in small quantities is effective to reduce the amount of extractable mercury within the lamp to less than 0.2 milligrams per liter of an aqueous acid solution as prescribed in the TCLP.

A further object of the invention is to provide a method for reducing the quantity of mercury extractable from a fluorescent lamp to less than 0.2 milligram per liter of an aqueous acid solution, as prescribed in the TCLP, using only a small quantity of a suitable chemical agent.

With the above and other objects in view, as will hereinafter appear, a feature of the present invention is the provision in a mercury vapor discharge lamp having an envelope of light-transmitting vitreous material containing an inert gas and a quantity of elemental mercury at least partially convertible to soluble mercury, and first and second electrodes disposed within the envelope for establishing an arc discharge therebetween, of an improvement comprising an effective amount of a nonmetallic copper-containing compound disposed in the lamp which, when the lamp is pulverized to granules and subjected to a suitable aqueous acid solution as defined by the TCLP, dissolves in the aqueous acid solution, resulting in a concentration of extracted mercury less than 0.2 mg per liter of extraction fluid.

In accordance with a further feature of the invention, there is provided a method for reducing the amount of mercury extractable from a mercury vapor discharge lamp when the lamp is pulverized to granules and subjected to a suitable aqueous acid solution as defined by the TCLP, such that the concentration of extracted mercury is less than 0.2 mg per liter of extraction fluid, the method comprising the step of placing in the lamp, in manufacture thereof, an effective amount of a nonmetallic copper-containing compound soluble in the aqueous acid solution.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention. For example, the invention described herein finds application not only in the traditional mercury vapor discharge lamps, but also in the more recent high intensity discharge (HID) lamps.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Molecular oxygen and metal parts typically present in commercial mercury vapor discharge lamps play important roles in determining the leachability of the metallic and ionic forms of mercury. This is shown in the following table which lists the concentration of ionic mercury found in the leachates produced when commercial FO32 T8 fluorescent lamps with typical metal components and containing either 4.5 mg $Hg^0$ (zero-valent mercury) or 4.5 mg Hg as HgO (ionic mercury) are subjected to the standard Federal TCLP.

TABLE 1

| Presence of Metal Lamp Parts | Presence of Oxygen | 4.5 mg $Hg^0$ mg Hg/l | 4.5 mg Hg as HgO mg Hg/l |
|---|---|---|---|
| no | yes | 0.01 | 1.30 |
| yes | no | 0.03 | 0.13 |
| yes | yes | 0.11 | 0.61 |

In the absence of metallic lamp components, $Hg^0$ is substantially nonextractable by the TCLP, while substantially all of the ionic mercury is easily extracted from the lamp. $Hg^0$ is still not extracted by the TCLP in the presence of the metallic lamp parts but in the absence of molecular oxygen; however, almost all of the ionic mercury is rendered nonextractable under these conditions, presumably via redox reactions involving adsorbed mercury ions and the metallic lamp components. Finally in the presence of both molecular oxygen and typical metallic lamp components, a portion of the $Hg^0$ becomes extractable as does a great deal more of the soluble ionic mercury. In other words, molecular oxygen (dissolved within the TCLP extraction fluid) causes the extraction of zero-valent mercury and, apparently, counteracts the reducing effects of the typical lamp metals vis a vis soluble ionic mercury which may also be present within the lamp.

These effects have been interpreted to result from a competition between two processes: 1) the reduction of ionic mercury via redox reactions involving metallic lamp components upon which the mercury ions may be adsorbed, and 2) reoxidation of the finely divided zero-valent mercury via reactions involving dissolved oxygen. The list of metals commonly employed in the fabrication of a fluorescent lamp includes, among others: iron, nickel, steel, copper, brass, aluminum, tungsten, and tin, along with various combinations of the above. Further, as described in U.S. Pat. No. 5,229,687, the amount of extractable mercury can be reduced to quite low levels by the inclusion of finely divided metals which are poorer oxidizing agents than is mercury. Most of the metals commonly used in the manufacture of fluorescent lamps fall into this category, although metallic iron, copper, and brass appear to be particularly effective in this regard. The dissolved ionic mercury adsorbs upon the surface of the metal where it is reduced to zero-valent mercury, along with the simultaneous oxidation of the less noble metal. Thus, as the metal surface area available for the adsorption and subsequent reduction of ionic mercury increases, the overall $Hg^{2+}$ reduction rate becomes large compared to the rate at which the reduced mercury is reoxidized, greatly reducing the amount of extracted mercury. However, as shown in U.S. Pat. No. 5,229,687, the quantity of finely divided metal required to substantially reduce the quantity of extractable mercury may be rather large (several grams per lamp) or impractical to dispose in the lamp.

Figure 1:
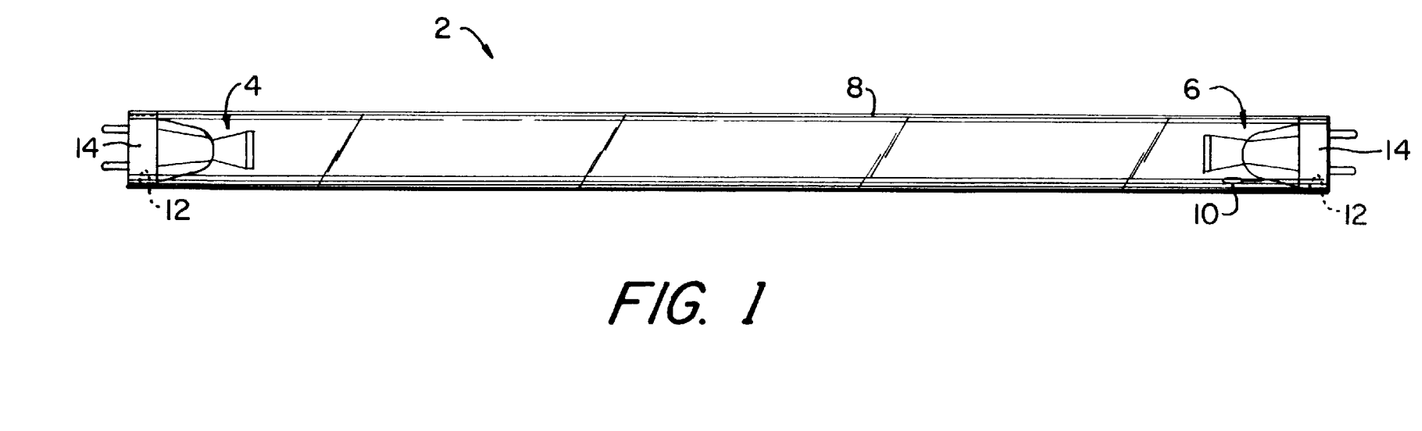
FIG. 1 is a side elevational view of one form of mercury vapor discharge lamp illustrative of an embodiment of the invention.

Referring to FIG. 1, it will be seen that an illustrative mercury vapor discharge lamp 2 includes first and second electrodes 4, 6 as opposite ends of an elongated envelope 8 of vitreous material.

Figure 2:
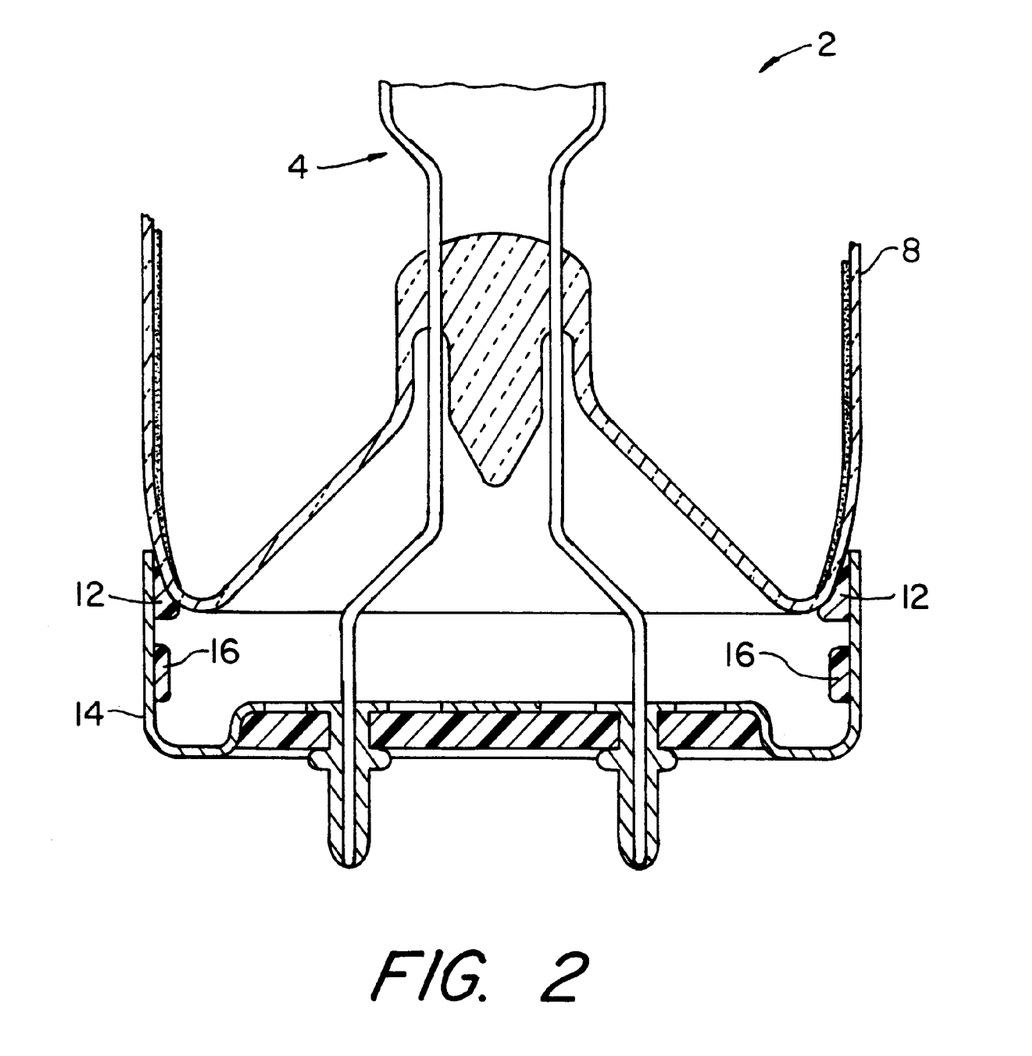
FIG. 2 is an enlarged cross sectional view of one end of the lamp of FIG. 1.

In accordance with the invention, there is disposed in the lamp envelope 8 a relatively small quantity of a nonmetallic copper-containing compound soluble in the aqueous acid solution employed in the Toxicity Characteristic Leaching Procedure (TCLP). The additive, which may be incorporated into the lamp in any one of a variety of ways, substantially reduces the amount of mercury that may be leached from the lamp as determined by the standard TCLP. The additive may be sealed within an enclosure 10 (e.g., glass) which is rupturable upon pulverization of the lamp. Alternatively, the material may be mixed with the basing cement 12 used to secure lamp bases 14 to the glass envelope 8, as shown in FIGS. 1 and 2, or may be mixed with a binder and incorporated as a separate phase 16 distinct from the basing cement 12 (FIG. 2). The quantity of material needed to render the mercury partially or almost totally nonextractable is typically much smaller than that required in the prior art, as for example, in U.S. Pat. Nos. 5,229,686 and 5,229,687. The advantages of this new approach are demonstrated in the following examples.

EXAMPLE 1

TCLP tests were carried out with standard-sized linear fluorescent lamps (32WT8 or 40WT12) and with 26W double-tube compact fluorescent lamps. The 26W compact fluorescent, T8, and T12 lamps typically weigh about 75 grams, 180 grams, and 280 grams, respectively. So as to simulate the conditions present in fully exhausted lamps in which most of the metallic mercury may have been converted to the ionic water-soluble form, the lamps were fabricated without metallic Hg. Rather, when the TCLP tests were carried out, a quantity of water-soluble HgO was added equivalent to an amount of metallic mercury in the range typically found within each of the three lamp types. Also included in each test was a relatively small amount of a nonmetallic copper-containing compound soluble in the aqueous acid solution employed in the TCLP. As shown in Table 2, the additive compounds tested included copper sulfate ($CuSO_4$), cuprous chloride (CuCl), copper acetate ($CuAc_2$), copper dihydroxide carbonate ($Cu_2(OH)_2CO_3$), and cuprous oxide ($Cu_2O$).

The results of these tests are summarized in Table 2. Listed are the lamp type, additive and amount thereof, total Hg (added as HgO and expressed as mg of Hg per liter of extraction fluid), the amount of extracted Hg (both with and without the copper additive) and the percent reduction in extracted Hg caused by the presence of the copper additive. As shown, all of the copper-containing materials reduced the concentration of extracted mercury to a fraction of the amount that would be found without the additive, and most materials reduced the extracted mercury concentration to less than 10% of its value in the absence of the copper-containing compound.

TABLE 2

TCLP Results for 26 W D, T8, and T12 Lamps
Without Metallic Hg
With Dissolved $Hg^{2+}$ (from HgO)
With Various Nonmetallic Copper-Containing
Compounds as Additives

| Lamp | Additive/Concn. (Wt of Cu/Wt of Lamp, mg/gm) | Total Hg (mg/l) | Leached Hg With Add. (mg/l) | Leached Hg Without Add. (mg/l) | Percent Leached Hg Decrease |
|---|---|---|---|---|---|
| 26WD | $CuSO_4$/1.3 | 2.5 | 0.06 | 0.81 | 93 |
| T8 | CuCl/1.3 | 1.25 | 0.05 | 0.65 | 92 |
| T12 | $CuAc_2$/1.3 | 1.58 | 0.06 | 0.67 | 91 |
| T12 | $Cu_2(OH)_2CO_3$/1.3 | 1.58 | 0.06 | 0.67 | 91 |
| T8 | $Cu_2O$/2.0 | 1.25 | 0.07 | 0.65 | 89 |
| T8 | $CuSO_4$/0.6 | 1.25 | 0.16 | 0.65 | 75 |

EXAMPLE 2

The results of an additional series of TCLP tests with 40W T12 lamps made without metallic mercury, but with added HgO equivalent to 9 mg of Hg, and with an amount of soluble copper sulfate, copper acetate, or copper dihydroxide carbonate equivalent to a 1.3 ratio of soluble copper weight (in mg) to total lamp weight (in gm) are shown in Table 3. Also included are the results obtained in the absence of a soluble copper compound. As indicated, copper ions dissolved in the TCLP extraction fluid are very effective agents for the reduction of extractable mercury in mercury vapor lamps. Furthermore, the effectiveness of the dissolved copper is independent of its source.

TABLE 3

TCLP Results for T12 Lamps
Without Metallic Hg
With 9 mg Hg as HgO
With Various Soluble Copper Compounds (1.3 mg Cu/gm Lamp)

| Soluble Copper Compound | [Hg] (mg/l) |
|---|---|
| None | 0.64 |
| Copper Sulfate | 0.05 |
| Copper Acetate | 0.06 |
| Copper Dihydroxide Carbonate | 0.06 |

EXAMPLE 3

Four TCLP tests were performed with standard 40W T12 lamps burned in standard fixtures for about 20,000 hours. One test was performed without the addition of soluble copper, while the remaining three tests were carried out with the addition of $Cu_2(OH)_2CO_3$ equivalent to a 2.5 ratio of soluble copper weight (in mg) to total lamp weight (in gm). As shown in Table 4, an order of magnitude reduction in extracted mercury concentration resulted from the presence of the soluble copper.

TABLE 4

TCLP Results for Aged T12 Lamps
With $Cu_2(OH)_2CO_3$ Equivalent to 2.5 mg Cu
per gm of Total Lamp Weight

| | | | |
|---|---|---|---|
| Designer F40/D830 | 19234 Hours | (without copper) | 1.20 mg Hg/l |
| Designer F40/D35/SS | 20142 Hours | (with copper) | 0.12 mg Hg/l |
| Household F40/D30 | 25376 Hours | (with copper) | 0.10 mg Hg/l |
| Designer F40/D835 | 26400 Hours | (with copper) | 0.10 mg Hg/l |

EXAMPLE 4

A TCLP test was carried out with an 32W T8 fluorescent lamp made without metallic mercury, but with the addition of soluble HgO equivalent to 4.5 mg Hg and soluble copper from $Cu_2(OH)_2CO_3$ equivalent to 2.5 mg soluble copper per gm of total lamp weight. The concentration of extracted mercury at the end of the test was only 0.06 mg/l. A second test was performed in the same way except that all of the lamp metals were excluded from the test. In this case, the extracted mercury concentration at the end of the test was 0.88 mg/l. These results, summarized in Table 5, reflect the fact that the reduction of ionic mercury upon the surfaces of metal lamp parts is facilitated by the presence of a small amount of dissolved copper. Also shown in Table 5 are the results of another TCLP test performed with 30 mg Hg as HgO and $Cu_2(OH)_2CO_3$ equivalent to 2.5 mg soluble copper per gm of total lamp weight. However, in this test all of the lamp metals were removed except for the brass pins and iron alloy lead wires. The extracted mercury concentration at the end of the test was 0.09 mg/l, suggesting that it may be the brass pins and lead wires that are primarily responsible for the reduction of extractable mercury.

TABLE 5

TCLP Results for T8 Lamps and Lamp Parts
Without Metallic Hg
With 4.5 or 30 mg Hg as HgO
With $Cu_2(OH)_2CO_3$ Equivalent to 2.5 mg Cu
per gm of Total Lamp Weight

| | |
|---|---|
| Condition 1 | |
| Complete Lamp + 4.5 mg Hg as HgO | 0.06 mg Hg/l |
| Condition 2 | |
| Lamp with All Metals Removed + 4.5 mg Hg as HgO | 0.88 mg Hg/l |
| Condition 3 | |
| Lamp Pins and Lead Wires + 30 mg Hg as HgO | 0.09 mg Hg/l |

EXAMPLE 5

Figure 3:
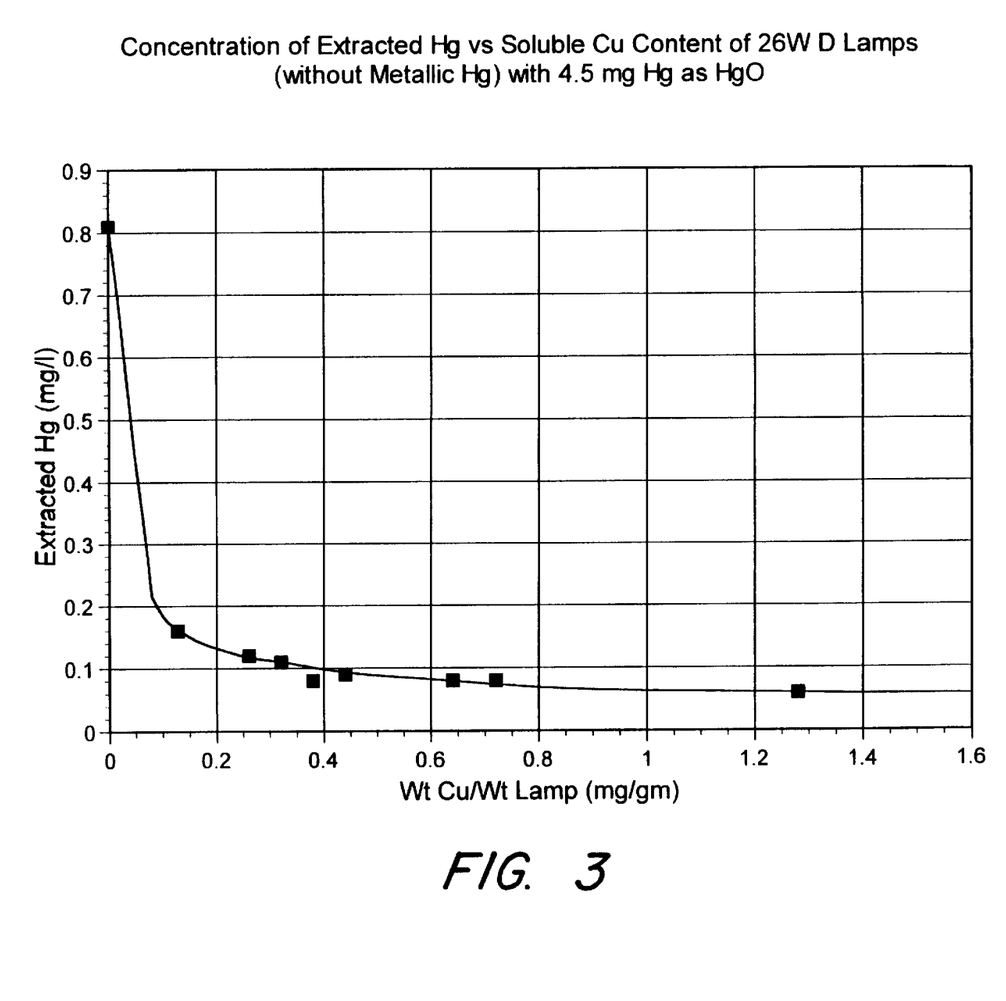
FIGS. 3–6 are graphs illustrating leachable mercury extracted by TCLP tests wherein a nonmetallic copper-containing compound, in accordance with the present invention, is disposed in the lamp.

A series of TCLP tests were performed upon 26W double-tube compact fluorescent lamps made without metallic mercury. In each test, a quantity of soluble HgO equivalent to 4.5 mg Hg was added per lamp, along with an amount of soluble copper ranging up to 1.3 mg of soluble copper per gram of total lamp weight. The amount of mercury in solution at the end of the test is plotted as a function of the copper content of the lamp in FIG. 3. As shown, extracted mercury concentrations below 0.2 mg/l were obtained with copper concentrations exceeding about 0.1 mg Cu per gram of total lamp weight.

EXAMPLE 6

Figure 4:
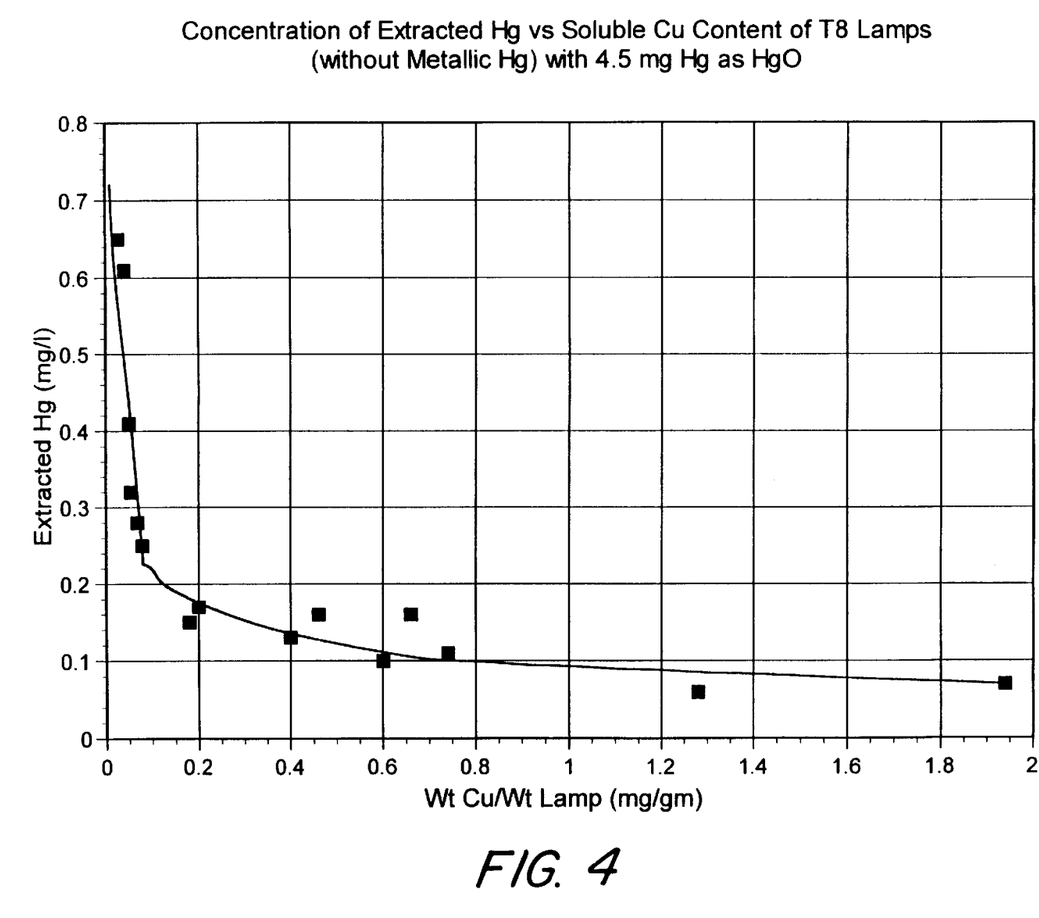

Another series of TCLP tests were performed upon 32W T8 fluorescent lamps made without metallic mercury. In each test, a quantity of soluble HgO equivalent to 4.5 mg Hg was added, along with an amount of soluble copper ranging up to about 2 mg of soluble copper per gram of total lamp weight. The amount of mercury in solution at the end of the test is plotted as a function of the copper content of the lamp in FIG. 4. As shown, extracted mercury concentrations below 0.2 mg/l were obtained with copper concentrations exceeding about 0.1 mg Cu per gram of total lamp weight.

EXAMPLE 7

Figure 5:
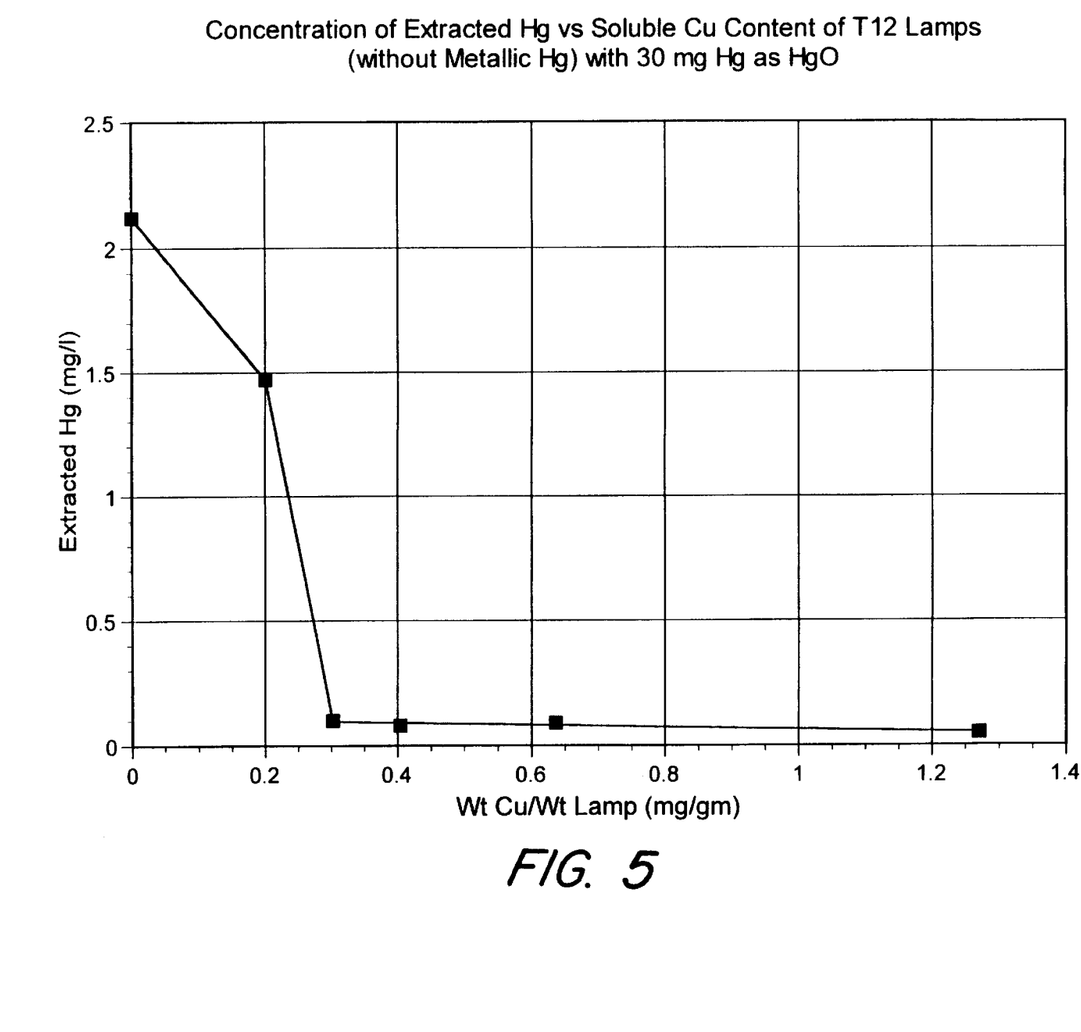

Another series of TCLP tests were performed upon 40W T12 fluorescent lamps made without metallic mercury. In each test, a quantity of soluble HgO equivalent to 30 mg Hg was added, along with a source of soluble copper ranging up to 1.3 mg of soluble copper per gram of total lamp weight. The amount of mercury in solution at the end of the test is plotted as a function of the copper content of the lamp in FIG. 5. As shown, extracted mercury concentrations below 0.2 mg/l were obtained with copper concentrations exceeding about 0.3 mg Cu per gram of total lamp weight.

EXAMPLE 8

Figure 6:
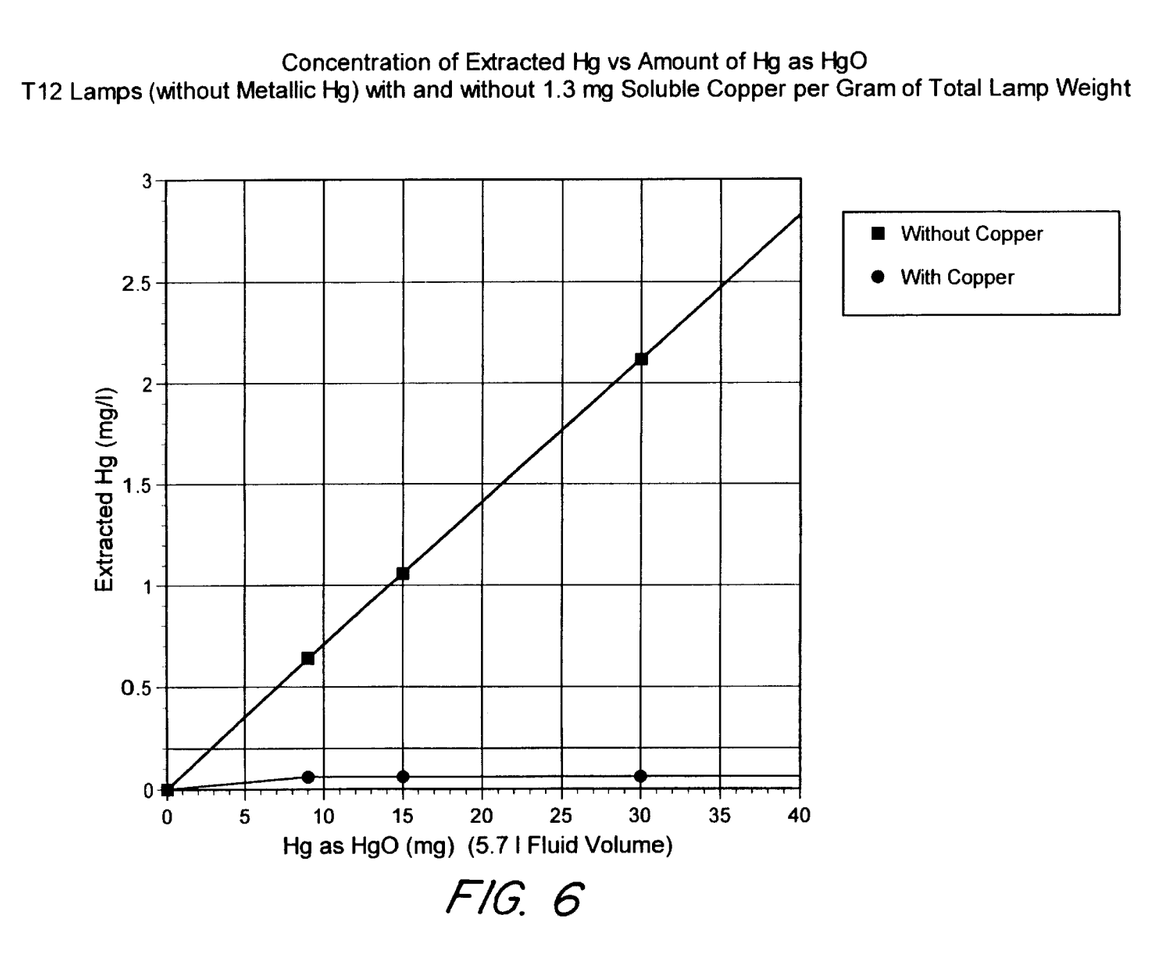

Still another series of TCLP tests were performed upon 40W T12 fluorescent lamps made without metallic mercury. In each test, a quantity of soluble HgO equivalent to between 0 and 30 mg Hg was added, along with a quantity of $Cu_2(OH)_2CO_3$ equivalent to about 1.3 mg Cu per gram of total lamp weight. The amount of mercury in solution at the end of the test is plotted as a function of initial mercury concentration in FIG. 6. In the absence of the soluble copper compound, the amount of extracted mercury increases linearly with the amount of soluble mercury present at the start of the test. With the dissolved copper, however, the concentration of extracted mercury did not exceed about 0.06 mg/l independent of the initial dissolved mercury concentration.

EXAMPLE 9

A 40W T12 lamp was fabricated using aluminum endcaps on the inside surface of which were attached layers of the normal phenolic-resin lamp basing cement in which a portion of the calcium carbonate filler had been replaced by a quantity of $Cu_2(OH)_2CO_3$ equivalent to about 1.0 mg soluble copper per gram of total lamp weight. No metallic mercury was added to the lamp. Rather, when the lamp was subjected to TCLP testing, HgO equivalent to 15 mg of metallic mercury was added in order to simulate the worst case end of life condition in which all of the mercury would be present in the ionic, water soluble form. The concentration of extracted mercury was determined to be 0.12 mg per liter of TCLP fluid, much smaller than the 1.06 mg/l that would normally be measured in the absence of the soluble copper additive. A second test was performed in exactly the same way except that 30 mg of soluble mercury as HgO was used, rather than the 15 mg used in the first test. In this case, the concentration of extracted mercury was determined to be 0.13 mg/l, a small fraction of the 2.12 mg/l value that is typically measured without the soluble copper.

EXAMPLE 10

A 40WT12 lamp was fabricated using aluminum endcaps, on the inside surface of which were attached two layers of phenolic resin basing cement. The first layer of cement, being the layer responsible for bonding the endcap to the glass envelope, contained the normal amount of calcium carbonate filler material. In the second layer of cement, however, a portion of the calcium carbonate filler had been replaced by a quantity of copper hydroxide ($Cu(OH)_2$) equivalent to about 1.1 mg soluble copper per gram of total lamp weight. No metallic mercury was added to the lamp. Rather, when the lamp was subjected to TCLP testing, HgO equivalent to 15 mg of metallic mercury was added in order to simulate the worst case end of life condition in which all of the mercury would be present in the ionic, water soluble form. The concentration of extracted mercury was determined to be 0.09 mg per liter of TCLP fluid, much smaller than the 1.06 mg/l that would normally be measured in the absence of $Cu(OH)_2$.

There is thus provided a mercury vapor discharge lamp wherein a relatively small amount of an agent disposed within the lamp envelope serves to reduce the amount of extractable mercury within the lamp to less than 0.2 mg per liter of an aqueous acid solution as determined by the Toxicity Characteristic Leaching Procedure. There is further provided a method for reducing the quantity of mercury extracted from a mercury vapor discharge lamp to less than 0.2 mg per liter of an aqueous acid solution as determined by the Toxicity Characteristic Leaching Procedure. The effective amount of nometallic copper-containing compound is that which results in between approximately 0.1 mg and approximately 4 mg of soluble copper per gram of total lamp weight.

While the mechanism by which soluble copper reduces the amount of extractable mercury has not been shown, a possible explanation might be found in the well known catalytic effect of dissolved copper on the decomposition of hydrogen peroxide.

It is well known that the reduction of $O_2$ to $H_2O$ frequently proceeds via a two-step process. In the first step, molecular oxygen is reduced to hydrogen peroxide, while in the second step the hydrogen peroxide intermediate is reduced to water.

This reaction scheme holds for oxygen reduction on metallic mercury, as well as on metals such as zinc, iron, and aluminum, when they corrode in acidic aerated solutions. It is also known that while the oxidation of metallic mercury via reaction with molecular oxygen may be thermodynamically favorable, this reaction is kinetically inhibited. However, the reactions between metallic mercury and peroxides are considerably more favorable. Thus, the oxidation of metallic mercury should proceed more rapidly in the presence of peroxide formed, e.g., via the reduction of molecular oxygen upon the surface of a more easily oxidized material, such as metallic iron or copper, metals typically present within a fluorescent lamp. The presence of hydrogen peroxide formed via the reduction of molecular oxygen upon the surface of lamp metals immersed within the TCLP extraction fluid may be responsible, therefore, for the increased extractability of both metallic and ionic mercury in the presence of both metal lamp parts and molecular oxygen. This may also clarify why metallic mercury is not extracted in the absence of either of these components (see Table 1).

Assuming accuracy in the above explanation for the increased extractability of mercury in the presence of both metallic lamp parts and molecular oxygen, it appears that mercury extractability might be reduced, or practically eliminated, by an agent which acts to reduce or eliminate the hydrogen peroxide generated via the reduction of molecular oxygen upon the surfaces of the various metal lamp components. Moreover, such an agent would be most effective if dissolved within the extraction fluid so that it operates immediately upon any and all hydrogen peroxide formed.

In a comprehensive review article on the 'Decomposition of Hydrogen Peroxide by Catalysts in Homogeneous Aqueous Solution' published in 1952, Baxendale summarized what was then known about the effectiveness of a variety of homogeneous catalysts for the decomposition of $H_2O_2$ to water and oxygen. Since then, numerous investigators have written on this subject, focusing principally upon the effectiveness of various soluble iron and copper salts and complexes. Materials known to catalyze $H_2O_2$ decomposition include, among others, compounds of copper, iron, cobalt, lead, manganese, cerium, chromium, and titanium, the halogens and halides. The obvious commonality between these catalysts is that they can exist in aqueous solutions with the metal atom in more than one relatively stable oxidation state and, hence, can participate in redox processes in which the metal atom may cycle between the two states $-Fe^{+2}/Fe^{+3}$, $Cu^+/Cu^{+2}$, etc.

A number of these catalysts have been tried as additives in TCLP tests with T8 or T12 fluorescent lamps manufactured without metallic mercury but with the addition of a quantity of water-soluble HgO equivalent to an amount of metallic mercury in the range typically found within each lamp type. Specifically, compounds of copper, manganese, and iron soluble in the TCLP extraction fluid, as well as two halides (NaCl and NaBr) have been evaluated with dissolved catalyst concentrations in the millimolar range. The results of these tests are listed in Table 6. Thus, whereas soluble copper compounds have generally been found most effective as agents for the reduction of extractable mercury, other known catalysts for the decomposition of $H_2O_2$ may be used although with generally more limited effectiveness.

However, notwithstanding the plausibility of this explanation for the effectiveness of dissolved copper (and certain other soluble potentially catalytic materials) as agents for the reduction of extractable mercury, the possible importance of other factors, such as the effects these dissolved materials might have upon the corrosion reactions of the various lamp metals, cannot at this point be ruled out.

TABLE 6

TCLP Results for T8 and T12 Lamps
Without Metallic Hg
With Dissolved $Hg^{2+}$ (from HgO)
With Various Additives Known to Catalyze the
Decomposition of $H_2O_2$

| Lamp | Additive/Concn. | Total Hg (mg/l) | Leached Hg With Add. (mg/l) | Leached Hg Without Add. (mg/l) | Percent Leached Hg Decrease |
|---|---|---|---|---|---|
| T12 | $CuAc_2$ 0.001 M | 1.58 | 0.06 | 0.67 | 91 |
| T12 | $MnSO_4$ 0.001 M | 1.58 | 0.06 | 0.67 | 91 |
| T8 | $CuSO_4$ 0.0005 M | 1.25 | 0.16 | 0.65 | 75 |
| T8 | $FeSO_4$ 0.001 M | 1.25 | 0.18 | 0.65 | 72 |
| T8 | $FeAc_2$ 0.0005 M | 1.25 | 0.28 | 0.65 | 57 |
| T8 | NaBr 0.001 M | 1.25 | 0.27 | 0.65 | 58 |
| T8 | NaCl 0.001 M | 1.25 | 0.29 | 0.65 | 55 |

It is to be understood that the present invention is by no means limited to the particular construction and method herein disclosed and/or shown in the drawings, but also comprises any modifications or equivalents within the scope of the claims, in particular such modifications as might be necessary to apply the invention to other types and sizes of mercury vapor discharge lamps.

What is claimed is:

1. In a mercury vapor discharge lamp having an envelope of light-transmitting vitreous material containing an inert gas and a quantity of elemental mercury at least partially convertible to soluble mercury, and first and second electrodes disposed within said envelope for establishing an arc discharge therebetween, the improvement comprising an effective amount of a nonmetallic copper-containing compound disposed in said lamp which, when said lamp is pulverized to granules and subjected to a suitable aqueous acid solution, dissolves in said aqueous acid solution, resulting in a concentration of extracted mercury less than 0.2 mg per liter of solution.

2. The lamp in accordance with claim 1 wherein said effective amount of said copper compound comprises between 0.1 and 4 mg of soluble copper per gram of total lamp weight.

3. The lamp in accordance with claim 1 wherein said compound is enclosed in a rupturable capsule disposed in said envelope.

4. The lamp in accordance with claim 1 wherein said compound is mixed with a basing cement securing a lamp base portion to said envelope.

5. The lamp in accordance with claim 1 wherein said compound is incorporated in a solid body fixed in said envelope.

6. The lamp in accordance with claim 1 wherein said copper compound comprises a compound selected from a group of compounds, said group consisting of copper sulfate, copper acetate, copper dihydroxide carbonate, cuprous oxide, cuprous chloride and copper hydroxide.

7. A method for reducing the amount of mercury extractable from a mercury vapor discharge lamp when the lamp is pulverized to granules and subjected to a suitable aqueous acid solution to less than 0.2 mg per liter of solution, said method comprising the step of placing in the lamp in manufacture thereof an effective amount of a nonmetallic copper-containing compound soluble in the aqueous acid solution.

8. The method in accordance with claim 7 wherein said copper compound placed in said lamp comprises between 0.1 and 4 mg of soluble copper per gram of total lamp weight.

9. The method in accordance with claim 7 wherein said copper compound comprises a compound selected from a group of compounds, said group consisting of copper sulfate, copper acetate, copper dihydroxide carbonate, cuprous oxide, cuprous chloride and copper hydroxide.

* * * * *